United States Patent
Kikinis et al.

(10) Patent No.: US 8,522,266 B1
(45) Date of Patent: Aug. 27, 2013

(54) SYSTEM AND METHOD FOR INSERTION OF RECORDED MEDIA INTO A BROADCAST

(75) Inventors: Dan Kikinis, Saratoga, CA (US); Yakov Kamen, Cupertino, CA (US)

(73) Assignee: JLB Ventures LLC, Washington, DC (US)

( * ) Notice: Subject to any disclaimer, the term of this patent is extended or adjusted under 35 U.S.C. 154(b) by 2015 days.

(21) Appl. No.: 09/661,164

(22) Filed: Sep. 13, 2000

(51) Int. Cl.
*H04N 7/10* (2006.01)
*H04N 7/025* (2006.01)

(52) U.S. Cl.
USPC .......... 725/32; 725/35; 725/36; 725/114; 725/115; 725/116; 725/117; 348/460; 348/705; 345/719; 345/809; 709/217; 709/218; 709/219; 386/46; 386/52; 386/125; 386/126

(58) Field of Classification Search
USPC ..... 725/32–36, 114–117, 136–139; 348/460, 348/705; 345/719, 809; 709/217–219; 386/46, 386/52, 125–126
See application file for complete search history.

(56) References Cited

U.S. PATENT DOCUMENTS

| | | | |
|---|---|---|---|
| 4,186,413 A * | 1/1980 | Mortimer ........................ | 348/473 |
| 4,621,259 A | 11/1986 | Schepers et al. | |
| 5,070,404 A * | 12/1991 | Bullock et al. ................. | 348/460 |
| 5,243,418 A | 9/1993 | Kuno et al. | |
| 5,260,778 A * | 11/1993 | Kauffman et al. ............... | 725/33 |
| 5,264,933 A * | 11/1993 | Rosser et al. .................. | 348/578 |
| 5,287,181 A * | 2/1994 | Holman ........................ | 348/473 |
| 5,317,391 A * | 5/1994 | Banker et al. .................. | 725/139 |
| 5,414,773 A * | 5/1995 | Handelman .................... | 725/117 |
| 5,479,268 A | 12/1995 | Young et al. | |
| 5,485,197 A | 1/1996 | Hoarty | |
| 5,526,034 A | 6/1996 | Hoarty et al. | |
| 5,532,754 A | 7/1996 | Young et al. | |
| 5,550,576 A | 8/1996 | Klosterman | |
| 5,550,578 A | 8/1996 | Hoarty et al. | |
| 5,684,525 A | 11/1997 | Klosterman | |
| 5,704,837 A | 1/1998 | Iwasaki et al. | |
| 5,724,492 A | 3/1998 | Matthews, III et al. | |
| 5,737,028 A | 4/1998 | Bertram et al. | |
| 5,745,710 A | 4/1998 | Clanton et al. | |
| 5,751,282 A | 5/1998 | Girard et al. | |
| 5,774,170 A * | 6/1998 | Hite et al. ....................... | 725/34 |
| 5,808,613 A | 9/1998 | Marrin et al. | |
| 5,818,441 A | 10/1998 | Throckmorton et al. | |
| 5,822,018 A * | 10/1998 | Farmer ........................... | 348/705 |
| 5,828,945 A | 10/1998 | Klosterman | |
| 5,841,563 A | 11/1998 | Effenberger | |
| 5,848,397 A * | 12/1998 | Marsh et al. .................... | 705/14 |
| 5,861,881 A | 1/1999 | Freeman et al. | |
| 5,900,915 A | 5/1999 | Morrison | |
| 5,917,489 A * | 6/1999 | Thurlow et al. ............... | 345/809 |

(Continued)

FOREIGN PATENT DOCUMENTS

WO     WO 00/01149 A1     1/2000

OTHER PUBLICATIONS

U.S. Office Action for related U.S. Appl. No. 09/858,762, mailed Apr. 13, 2010.

*Primary Examiner* — Jason Salce
(74) *Attorney, Agent, or Firm* — Banner & Witcoff, Ltd.

(57) ABSTRACT

A system and method for prioritizing the insertion of recorded media into a broadcast stream according to a comparison of priority indicators in the broadcast stream and in the recorded media insertion. The recorded media insertion may be multi-media in nature.

28 Claims, 5 Drawing Sheets

(56) References Cited

U.S. PATENT DOCUMENTS

| | | | |
|---|---|---|---|
| 5,923,362 A | 7/1999 | Klosterman | |
| 5,926,168 A | 7/1999 | Fan | |
| 5,929,849 A * | 7/1999 | Kikinis | 725/113 |
| 5,940,073 A | 8/1999 | Klosterman et al. | |
| 5,956,456 A | 9/1999 | Bang et al. | |
| 5,977,964 A | 11/1999 | Williams et al. | |
| 5,999,167 A | 12/1999 | Marsh et al. | |
| 5,999,187 A | 12/1999 | Dehmlow et al. | |
| 6,002,393 A * | 12/1999 | Hite et al. | 345/719 |
| 6,002,403 A | 12/1999 | Sugiyama et al. | |
| 6,029,195 A | 2/2000 | Herz | |
| 6,034,678 A | 3/2000 | Hoarty et al. | |
| 6,043,818 A | 3/2000 | Nakano et al. | |
| 6,061,055 A | 5/2000 | Marks | |
| 6,072,983 A | 6/2000 | Klosterman | |
| 6,075,575 A | 6/2000 | Schein et al. | |
| 6,078,348 A | 6/2000 | Klosterman et al. | |
| 6,081,271 A | 6/2000 | Bardon et al. | |
| 6,100,883 A | 8/2000 | Hoarty | |
| 6,141,003 A * | 10/2000 | Chor et al. | 715/719 |
| 6,141,058 A * | 10/2000 | Lagoni et al. | 348/563 |
| 6,167,188 A | 12/2000 | Young et al. | |
| 6,205,485 B1 | 3/2001 | Kikinis | |
| 6,205,582 B1 | 3/2001 | Hoarty | |
| 6,209,025 B1 * | 3/2001 | Bellamy | 709/217 |
| 6,233,389 B1 | 5/2001 | Barton et al. | |
| 6,243,039 B1 | 6/2001 | Elliot | |
| 6,271,831 B1 | 8/2001 | Escobosa et al. | |
| 6,351,474 B1 * | 2/2002 | Robinett et al. | 370/486 |
| 6,442,529 B1 | 8/2002 | Krishan et al. | |
| 6,556,197 B1 | 4/2003 | Van Hook | |
| 6,615,408 B1 * | 9/2003 | Kaiser et al. | 725/112 |
| 6,698,020 B1 * | 2/2004 | Zigmond et al. | 725/34 |
| 7,051,357 B2 * | 5/2006 | Carr | 725/110 |
| 7,143,430 B1 | 11/2006 | Fingerman et al. | |
| 2001/0014975 A1 * | 8/2001 | Gordon et al. | 725/91 |
| 2001/0037500 A1 * | 11/2001 | Reynolds et al. | 725/36 |
| 2002/0056129 A1 * | 5/2002 | Blackketter et al. | 725/112 |
| 2004/0128685 A1 | 7/2004 | Hassell et al. | |

* cited by examiner

SYSTEM AND METHOD FOR INSERTION OF RECORDED MEDIA INTO A BROADCAST

FIELD OF THE INVENTION

The present invention relates generally to broadcast systems and, more particularly, to a system and method for inserting recorded media into a broadcast.

BACKGROUND OF THE INVENTION

There are numerous technologies available for inserting media into broadcast systems. For instance, public announcements generated as text may be added to a video broadcast signal (e.g., to notify viewers of technical difficulties, critical events, weather alerts, etc.). The scheduled program continues uninterrupted while an announcement text is displayed on the television screen. It is also possible to receive notification of a private event (such as receiving an e-mail) through a television screen. Notification may be generated as text and displayed on the television screen or may take the form of a recorded audio announcement.

More particularly, in recent years the development of Germany's Verkehrsfunk (known broadly in Europe) has allowed people who listen to tapes or CD's to receive important announcements, generally relating to traffic information, without having to continually listen to a specific station just because it happens to periodically announce traffic information for the area. The system makes it possible, by means such as a simple tone decoder, to turn on and off the audio insert. However, Verkehrsfunk has some limitations. For one, the announcement interruption always takes precedence over the play of the recorded medium. The system is often so simplistic that the recording does not even pause, but rather continues to play unheard while the announcement is spoken. The listener thus misses part of the recording. Moreover, the system uses a simple switch-over of the source selector of the amplifier, so the medium of the announcement and the medium of the recording (in this case, both audio) must be identical.

In addition, the event driving the switch-over happens in real time. That is, the signal arrives and the event itself creates the signal. For example, when the speaker starts to make a traffic information announcement he pushes a button that turns on a first pilot tone and at the end of the announcement he pushes another button that creates an end pilot tone.

In essence, to date the insertion of media into broadcast systems interrupts the broadcast stream. Moreover, prior systems are inefficient in that they require the user's medium of choice and the medium of the insertion to be of the same type.

SUMMARY OF THE INVENTION

The present invention provides a system and method for prioritizing the insertion of recorded media into a broadcast stream according to a comparison of priority indicators in the broadcast stream and in the recorded media insertion. One embodiment provides a recorded media insertion that may be multi-media in nature.

According to one embodiment, a broadcast stream is transmitted and received. At some point in time, an event occurs which requires the insertion of recorded media. If the recorded media insertion is a low priority the insertion may be delayed until the system determines that it will cause the least amount of disturbance. If the recorded media insertion is a high priority, it may be inserted immediately into the broadcast stream. In one embodiment, priority indicators may range between "0," the highest priority, and "n," the lowest priority. There may be a varying number of levels between 0 and n, or only one level.

In one embodiment, a signal that is needed to change the priority of the event may be programmed by a time mark to synchronize with the broadcast stream. The signal may be included in the broadcast stream as a pilot tone or by watermarking video, audio, or other media or data transmitted. The signal may also be transmitted over a separate network, again with a time mark to synchronize with the broadcast stream. In addition, if the watermark relates to video it may also contain an area in which an overlay may be played. Once the recorded media insertion has either finished by running its length or the priority level has been changed by sending another watermark, the system returns to its original broadcast-only type performance.

In yet another alternative embodiment, the user's medium and the medium of the recorded insertion do not have to be of the same type (i.e., one could be video and the other could be audio, both could be video, or one could be video without audio and the other could be audio/video, etc.).

DETAILED DESCRIPTION

Described herein is a system and method for inserting recorded media into a broadcast stream. Throughout the following description specific details are set forth in order to provide a more thorough understanding of the invention. However, the invention may be practiced without these particulars. In other instances, well known elements have not been shown or described in detail to avoid unnecessarily obscuring the present invention. Accordingly, the specification and drawings are to be regarded in an illustrative, rather than a restrictive, sense.

One limitation of prior art techniques for media insertion into broadcast systems is that the insertion takes precedence over the play of the recorded medium. In cases where an announcement interrupts a recording, the listener misses part of the recording. It would be helpful if a system for media insertion into broadcast systems existed to prioritize the insertion according to priority indicators, such that the insertion may be delayed if it is a low priority and transmitted if it is a high priority. For example, if a user has been closely following a game show for nearly an hour and the answer to the million-dollar question finally arrives only to be obliterated by the voice-over "You've got mail," the user may be frustrated and upset. However, if a system existed to give the million-dollar answer a high priority level, the message "You've got mail" would have to wait until a low priority section of the broadcast stream.

Another limitation of prior art techniques for media insertion into broadcast systems is that the medium of the announcement and the user's medium typically need to be identical (i.e., audio and audio, video and video, etc.). It would be helpful if a system existed for the insertion of multi-media into a broadcast system.

Figure 5:
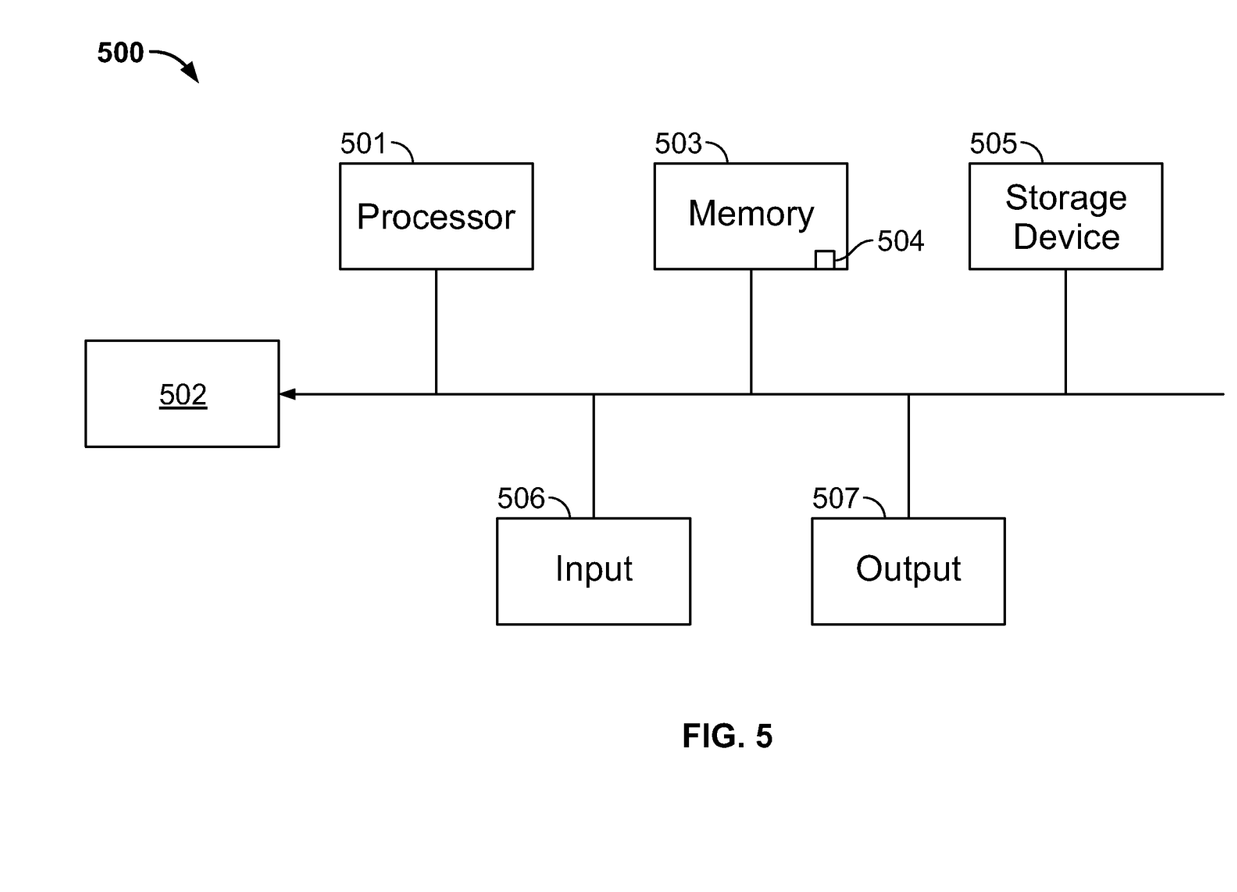
FIG. 5 is a block diagram of a computer system in accordance with one embodiment of the present invention.

The system and method disclosed herein may be integrated into advanced Internet-or network-based knowledge systems as related to information retrieval, information extraction, and question and answer systems. FIG. 5 is an example of one embodiment of a computer system 500. The system shown has a processor 501 coupled to a bus 502. Also shown coupled to the bus 502 are a memory 503 which may contain instructions 504 such as instructions for inserting media into a broadcast stream. Additional components shown coupled to the bus 502 are a storage device 505 (such as a hard drive, floppy drive, CD-ROM, DVD-ROM, etc.), an input device 506 (such as a keyboard, mouse, light pen, bar code reader, scanner, microphone, joystick, etc.), and an output device 507 (such as a printer, monitor, speakers, etc.). Of course, an exemplary computer system could have more components than these or a subset of the components listed.

The system and method described herein may be stored in the memory of a computer system (i.e., a set-top box) as a set of instructions to be executed, as shown by way of example in FIG. 5. In addition, the instructions to perform the system and method described herein may alternatively be stored on other forms of machine-readable media, including magnetic and optical disks. For example, the system and method of the present invention may be stored on machine-readable media, such as magnetic disks or optical disks, which are accessible via a disk drive (or computer-readable medium drive). Further, the instructions may be downloaded into a computing device over a data network in a form of a compiled and linked version.

Alternatively, the logic to perform the system and method described herein may be implemented in additional computer and/or machine-readable media such as discrete hardware components as large-scale integrated circuits (LSI's), application specific integrated circuits (ASIC's), firmware such as electrically erasable programmable read-only memory (EEPROM's), and electrical, optical, acoustical, and other forms of propogated signals (e.g., carrier waves, infrared signals, digital signals, etc.).

Figure 1:
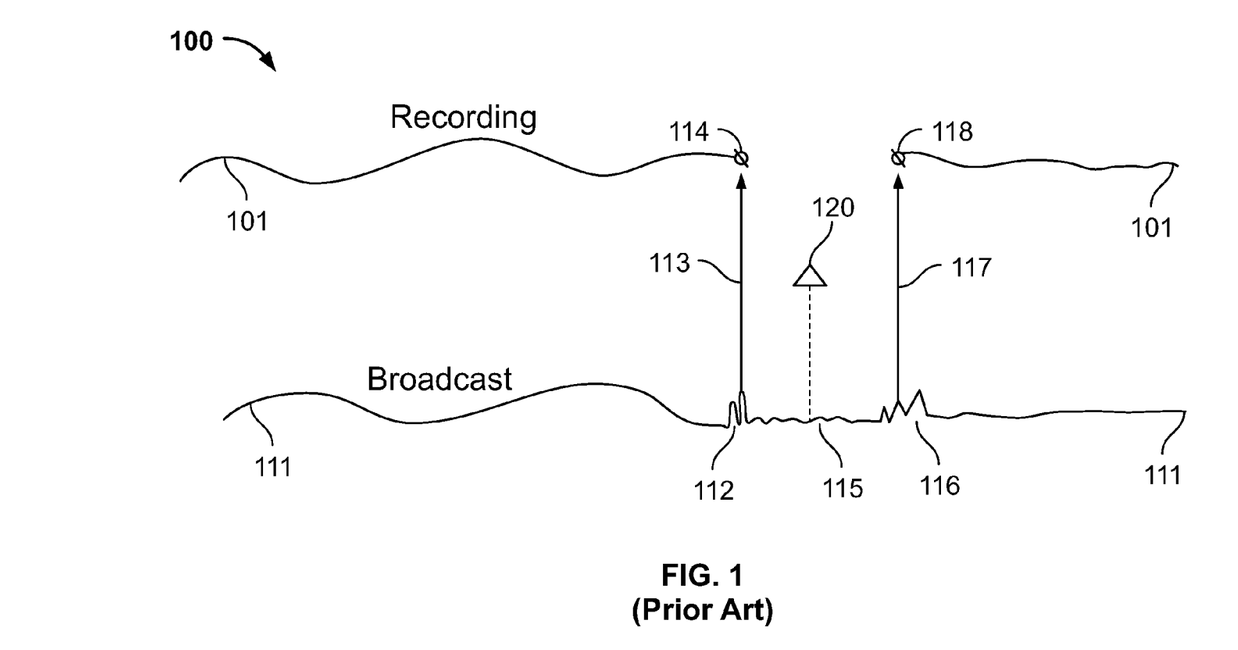
FIG. 1 is a block diagram illustrating a prior art system for inserting an audio announcement over a radio system by interrupting the play of a cassette or CD.

Referring now to FIG. 1 there is shown a block diagram illustrating inserting an audio announcement over a radio system 100 by interrupting the play of a cassette or CD. The stream of recording 101 may be a CD player, a cassette player, or any other device capable of reproducing audible sound from a recorded medium. The stream of recording 101 is part of a radio system 100 including an AM/FM receiver (not shown in this view), a tuner for tuning to a radio station (not shown in this view), one or more speakers (not shown in this view) and various other components well known to those skilled in the art of audio systems. Announcement 111 may be received by an unused tuner in the radio system 100 that is playing the music and may contain signal tones such as tones 112 and 116. When signal tones 112 and 116 turn on the announcement system, arrow 113 indicates that recorded medium is suspended at point 114. The announcement between the tones 115 can then be heard by the listener, because it is inserted as indicated by arrow 120. At the end of the announcement, tone 116 then switches play back to the recorded medium, which event is marked at point 118, and the remainder of the recording continues to play on track 101.

According to the illustration of FIG. 1, the announcement interruption takes precedence over the play of the recorded medium. Moreover, the medium of the announcement and the medium of the recording (in this case both audio) need to be identical.

Figure 2:
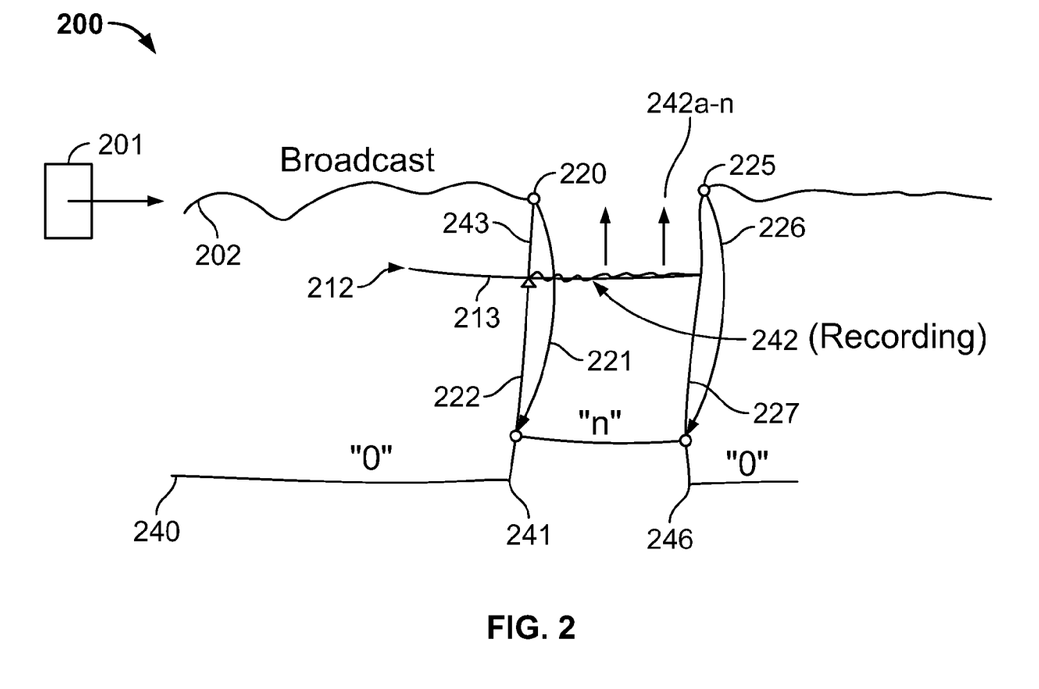
FIG. 2 is a block diagram illustrating inserting recorded media into a broadcast stream in a television system in accordance with one embodiment of the present invention.

Referring now to FIG. 2 there is shown a block diagram illustrating inserting recorded media into a broadcast stream in a television system 200 in accordance with one embodiment. The present invention may be implemented in any television system 200 including analog (e.g., using CRTs technology) as well as digital technologies (e.g., HDTV supporting interlaced format). It should be noted, however, that although television system 200 is used in the embodiment illustrated in FIG. 2, any system capable of receiving broadcast stream 202 may be used, including radio systems. Television system 200 typically includes a receiver for receiving a broadcast signal, a display screen, a tuner for extracting a television signal corresponding to a channel, and other standard components well known to those skilled in the art of television systems.

In the embodiment illustrated in FIG. 2, television system 200 also includes a set-top box (not shown in this view). The set-top box is generally a user interface unit comprising a CPU coupled to a read-only memory (ROM) and a random-access memory (RAM) (not shown in this view). The ROM includes instructions and data for executing on the CPU. The RAM is used for storing program variables for the program instructions contained in the ROM. The set-top box of the present invention also contains executable code, typically in software, for determining at what point to insert recorded media 213 into a broadcast stream 202 based on a comparison of priority indicators 240 in the recorded media insertion 213 and in the broadcast stream 202 in a manner that will be described in detail below.

According to the embodiment illustrated in FIG. 2, set-top box receives the broadcast stream 202 transmitted from a broadcast station 201 and delivers the broadcast stream 202 in real-time usable form to the receiver (not shown in this view) in the television system 200. At some point in time event 212 occurs, which requires the insertion of the recorded media 213 into the broadcast stream 202. The media may be a recorded announcement, overlay, text, video, or any other type of available media. The event 212 which triggers the recorded media insertion 213 into the broadcast stream 202 may be a variety of events, such as notification to a user of the television system 200 that an e-mail message has arrived, information regarding traffic or weather conditions, the state of the stock market, sports updates, etc. The recorded media insertion 213 and the broadcast stream 202 are assigned priority indicators 240 ranging between "0," the highest priority, and "n," the lowest priority. There may be any number of levels between 0 and n, or only one level. Of course, priority indicators 240 do not necessarily have to range between 0 and n. In another embodiment, for instance, priority indicators 240 may range from "1" through "9," "A" through "Z," or may even be symbols such as "*" for the highest priority and "-" for the lowest priority. Priority indicators 240 may be embedded into the broadcast stream 202 according to numerous known technologies, including a pilot tone or by watermarking either video, audio, or other media or data transmitted. A signal (not shown in this view) that is needed to change the priority indicators 240 may be programmed by a time mark. In this way, the recorded media insertion 213 synchronizes with the broadcast stream 202. It should also be noted that it is possible to use existing transport streams (such as the transport streams in digital television broadcasts) to embed the priority indicators 240 into the broadcast stream 202.

In a further aspect, the priority indicators 240 of various components of the broadcast stream 202 may be annotated by a broadcaster. For instance, the broadcaster may assign different priority indicators 240 to various segments of a newscast, such as priority indicator 0 to the actual program and priority indicator n to the commercials. Advertisers could also use the system for low-level local advertising during the newscast (or other program), for example, by allowing an advertiser to address just one subdivision of a population group or some geographic area located close to a specific store or service place. This kind of micro-advertising would allow broadcasters to sell inexpensive local advertising to businesses, which otherwise would not have a chance to get onto a major channel during prime-time. It is also possible for the user to assign priority indicators 240 to the recorded media insertion 213. For instance, the user may determine that all e-mail notifications from family members receive priority indicator 0 and all e-mail notifications from friends receive priority indicator n. The user may set for each level and each media type an ignore or a higher level to replace the broadcast stream, thus allowing the user to customize the experience.

In a further aspect of the present invention, priority indicators 240 in the broadcast stream 202 may be transmitted over a separate network (e.g., the Internet) (not shown in this view). In this embodiment, set-top box is connected to a server (not shown in this view) through the separate network. The server receives the priority indictor 240 of the broadcast stream 202 through the separate network and transmits the priority indicator 240 to the set-top box, rather than having the priority indicators 240 be embedded into the broadcast stream 202 through a watermark or some other method. In addition, the recorded media insertion 213 may either be transmitted in advance, using the same transport as is used by the program information, or may be transmitted over the separate network.

When watermark 220 arrives, vector 221 changes the priority indicator 240 at point 241 to level 1, which in turn releases a prerecorded announcement 242 for play by sending command 222 and suspending the replay or reducing the replay of the broadcast stream 202. Prerecorded announcement 242 is then inserted or overlaid, depending again on the medium type and the announcement content. Prerecorded announcement 242 may be, for example, a voice-over such as "You've got mail," that plays during a speaking pause in the program or it may be an overlay in the background of a video such as "Order your movie tickets now—Click here," generated as text and displayed on the television screen. Once the recorded media insertion 213 has either finished by running its length or the priority indicator 240 has been changed by sending a second watermark 225, the television system 200 returns to its original broadcast-only type performance as indicated by arrows 226, 227, and 242a through n. The earlier event 242a indicates that the media insertion 213 has stopped before the second watermark 225 is sent.

Non-conventional media may also be used. For example, odor media, not currently available, may be used to allow broadcasters to combine smells in broadcasts. Odor media may be used to advertise products (such as perfume, for instance, or pizza), to notify a user that their restaurant take-out meal is available, or in any other capacity where the release of an odor may be helpful. Also, the recorded media insertion 213 may be multi-media in nature. Depending on the required interrupt priority indicator 240, some recorded media insertion 213 may be played, while others may be held back. For example, "You've got mail" may be both a video clip and a sound file. Depending on the current priority indicator 240 of the broadcast stream 202 and on the priority indicator 240 assigned to the recorded media insertion 213, for example, only the sound or only the video would play, rather than both or none. Also, if there is no break in the priority of interrupt requests, a queue of recorded media insertions 213 may build, which eventually may be played, one at a time, or in a multiple view screen, showing all the icons/media at the same time, based on user requests.

In addition, all kinds of variations may be used for the user configurations and broadcast inserts as well as for the recordings, and all kinds of compression techniques, bitmapping techniques, 3-D texture mapping, etc.

Figure 3:
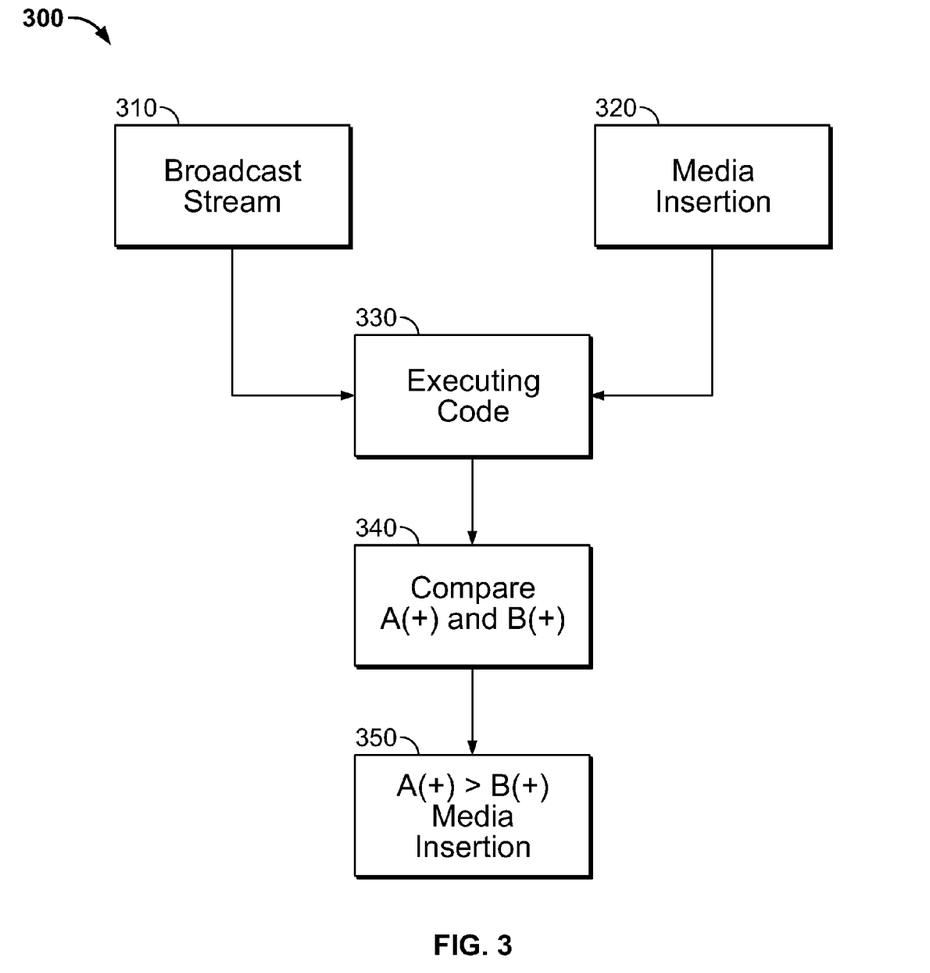
FIG. 3 is a flow chart describing the steps of comparing the priority indicators of a recorded media insertion with the priority indicators of a broadcast stream in accordance with one embodiment of the present invention.

Referring now to FIG. 3, there is shown a flow chart illustrating executing code to compare the priority indicator of a recorded media insertion with the priority indicator in a broadcast stream 300 in accordance with one embodiment. Broadcast stream 310 (e.g., a TV program) in any time frame has an assigned priority indicator A and recorded media insertion 320 has an assigned priority indicator B. Both priority indicator A and priority indicator B are functions of time $A(t)$ and $B(t)$. The executing code 330 compares $A(t)$ and $B(t)$ (processing block 340). If $A(t)$ is greater than $B(t)$ then the broadcast stream is not interrupted. Otherwise, an additional recorded media insertion 350 is superimposed on the broadcast stream.

Figure 4:
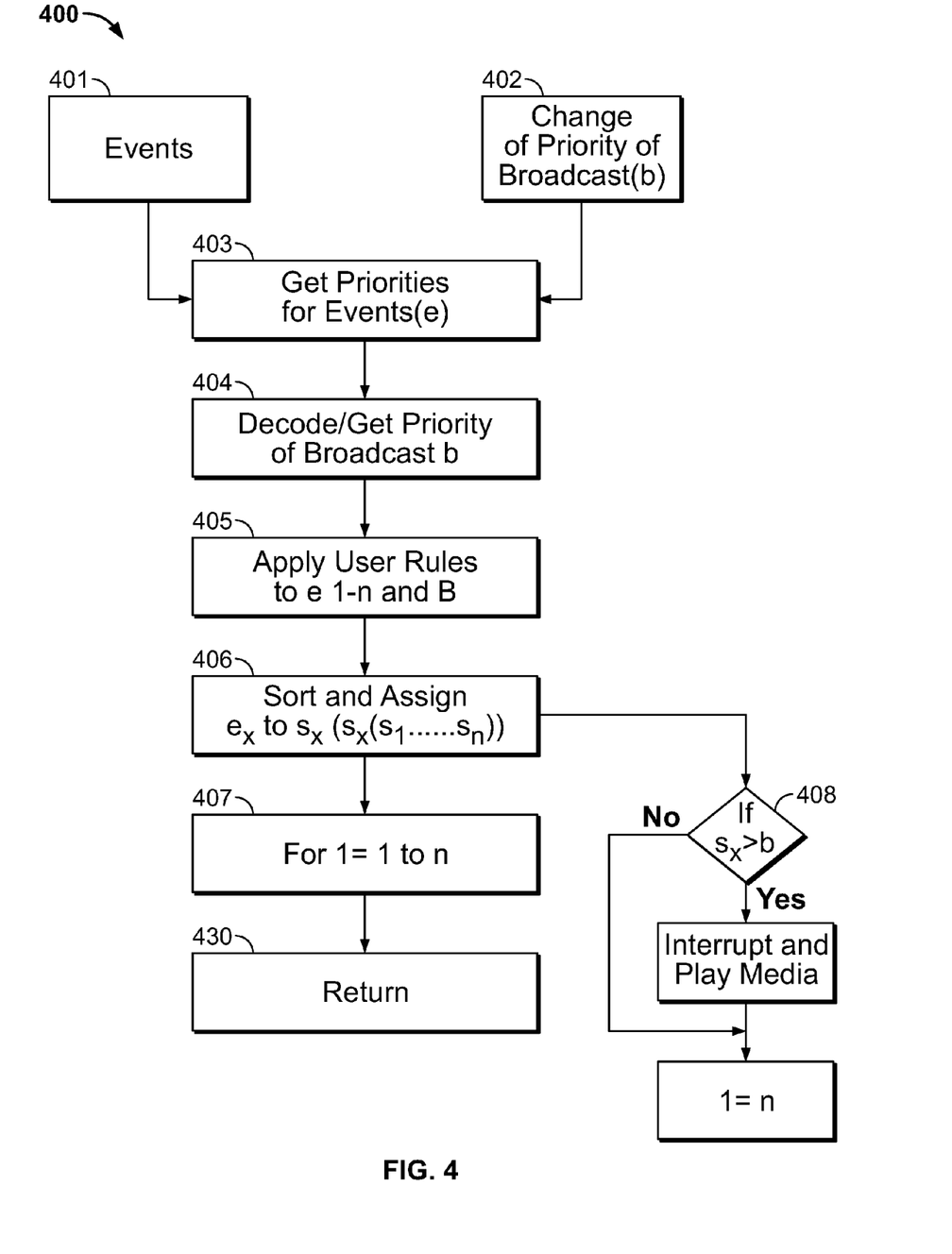
FIG. 4 is a flow chart describing the steps of an Insertion Analyzer comparing the priority indicators of a broadcast stream the with priority indicators of multiple recorded media insertions in accordance with one embodiment.

Referring now to FIG. 4, there is shown a flow chart of the steps for comparing priority indicators of a broadcast stream with priority indicators of multiple recorded media insertions 400 in accordance with one embodiment. One or more events 401 that require media insertions into a broadcast stream 402 trigger the initiation of the routine 400 (for example, through an interrupt as is well known in the art). At processing block 403 priority indicators for events 401 that trigger media insertions are called up. For instance, e-mail notifications may have a low priority indicator and phone call notifications may have a high priority indicator. Priority indicators of the media insertions are decoded as are the priority indicators of the broadcast stream 402 (processing block 404).

The routine 400 applies filter criteria (processing block 405) where a user may set their own preferences for events 401 triggering the media insertions (processing block 405). For instance, the user may give the highest priority indicator to media insertions for an event caused by a particular person causing the event (for instance, the highest priority indicator may be given to all e-mail notifications and phone call notifications from a user's spouse). At processing block 406 the routine 400 sorts media insertions by priority indicators, such that media insertions go through a loop (processing blocks 407 and 408). The loop compares the priority indicators of multiple media insertions against the priority indicators of the broadcast stream 402. The loop allows for media insertions into the broadcast stream 402 until an event with a media insertion with a lower priority than the broadcast stream 402 appears. The system 400 sorts (processing block 406) the media insertions by placing media insertions with the highest priority first. When all the media insertions have played, the routine interrupts (processing block 430) and a CPU (not shown in this view) that contains routine 400 returns to its original function.

Thus, a system and method for inserting recorded media into a broadcast stream has been described. Although the foregoing description and accompanying figures discuss and illustrate specific embodiments, it should be appreciated that the present invention is to be measured only in terms of the claims that follow.

What is claimed is:

1. A set-top box, comprising:
A memory storing computer readable instructions that, when executed, cause the set top box to:
receive a broadcast stream, a portion of the broadcast stream having a first priority indicator;
receive media separate from the broadcast stream, the media having a second priority indicator;
determine whether the first priority indicator is greater than the second priority indicator prior to receiving a signal configured to modify the first priority indicator from a first priority to a second priority;
in response to determining that the first priority indicator is greater than the second priority indicator, delay insertion of the separate media into the broadcast stream until the first priority indicator is modified;
receive the signal configured to modify the first priority indicator from the first priority to the second priority;
modify the first priority indicator from the first priority to the second priority in response to receiving the signal;
determine whether the modified first priority indicator is lower than the second priority indicator; and
replace the portion of the broadcast stream with the separate media in response to determining that the modified first priority indicator is lower than the second priority indicator.

2. The set-top box of claim 1, wherein each of the first and second priority indicators comprise at least one of a number, a letter, and a symbol.

3. The set-top box of claim 1, wherein the separate media and the broadcast stream are the same media.

4. The set-top box of claim 1, wherein the separate media and the broadcast stream are different media.

5. The set-top box of claim 1, wherein an event triggers receipts of the signal.

6. The set-top box of claim 5, wherein the event includes an arrival of an e-mail message.

7. The set-top box of claim 1, wherein the signal configured to change the first priority indicator is programmed by a time mark.

8. The set-top box of claim 1, wherein one or more additional priority indicators are associated with the broadcast stream using at least one of a pilot tone and a watermark.

9. The set-top box of claim 1, wherein the first and second priority indicators are user specified.

10. The set-top box of claim 1, wherein the set-top box is part of a television system or radio system.

11. An apparatus comprising:
a processor; and
memory storing computer readable instructions that, when executed by the processor, cause the apparatus to:
receive a broadcast stream, a portion of the broadcast stream having a first priority indicator;
receive media separate from the broadcast stream, the media having a second priority indicator;
determine whether the first priority indicator is greater than the second priority indicator prior to receiving a signal configured to modify the first priority indicator from a first priority to a second priority;
in response to determining that the first priority indicator is greater than the second priority indicator, delay insertion of the separate media into the broadcast stream until the first priority indicator is modified;
receive the signal configured to modify the first priority indicator from the first priority to the second priority;
modify the first priority indicator from the first priority to the second priority in response to receiving the signal;
determine whether the modified first priority indicator is lower than the second priority indicator; and
replace the portion of the broadcast stream with the separate media in response to determining that the modified first priority indicator is lower than the second priority indicator.

12. The apparatus of claim 11, wherein the separate media and the broadcast stream are the same media.

13. The apparatus of claim 11, wherein an event trigger is configured to trigger the receipt of the signal.

14. The apparatus of claim 11, wherein the signal configured to change the first priority indicator is programmed by a time mark.

15. The apparatus of claim 11, wherein one or more additional priority indicators are associated with the broadcast stream using at least one of a pilot tone and a watermark.

16. The apparatus of claim 11, wherein the first and second priority indicators are user specified.

17. A non-transitory computer readable medium storing machine-executable instructions that, when executed, cause an apparatus to:
receive a broadcast stream, a portion of the broadcast stream having a first priority indicator;
receive media separate from the broadcast stream, the media having a second priority indicator;
determine whether the first priority indicator is greater than the second priority indicator prior to receiving a signal configured to modify the first priority indicator from a first priority to a second priority;
in response to determining that the first priority indicator is greater than the second priority indicator, delay insertion of the separate media into the broadcast stream until the first priority indicator is modified;
receive the signal configured to modify the first priority indicator from the first priority to the second priority;
modify the first priority indicator from the first priority to the second priority in response to receiving the signal;
determine whether the modified first priority indicator is lower than the second priority indicator; and
replace the portion of the broadcast stream with the separate media in response to determining that the modified first priority indicator is lower than the second priority indicator.

18. The computer readable medium of claim 17, wherein the separate media and the broadcast stream are the same media.

19. The computer readable medium of claim 17, wherein an event triggers the receipt of the signal.

20. The computer readable medium of claim 17, wherein the signal configured to change the first priority indicator is programmed by a time mark.

21. The computer readable medium of claim 17, wherein one or more additional priority indicators are associated with the broadcast stream using at least one of a pilot tone and a watermark.

22. The computer readable medium of claim 17, wherein the first and second priority indicators are user specified.

23. A method comprising:
receiving, by a content receiving device, a broadcast stream, a portion of the broadcast stream having a first priority indicator;
receiving, by the content receiving device, media separate from the broadcast stream, the media having a second priority indicator;

determining, by the content receiving device, that the first priority indicator is greater than the second priority indicator prior to receiving a signal configured to modify the first priority indicator from a first priority to a second priority;

in response to determining that the first priority indicator is greater than the second priority indicator, delaying, by the content receiving device, insertion of the separate media into the broadcast stream until the first priority indicator is modified;

receiving, by the content receiving device, the signal configured to modify the first priority indicator from the first priority to the second priority;

modifying, by the content receiving device, the first priority indicator from the first priority to the second priority in response to receiving the signal;

determining, by the content receiving device, that the modified first priority indicator is lower than the second priority indicator; and replacing, by the content receiving device, the portion of the broadcast stream with the separate media in response to determining that the modified first priority indicator is lower than the second priority indicator.

24. The method of claim 23, wherein the separate media and the broadcast stream are the same media.

25. The method of claim 23, wherein an event triggers the receipt of the signal.

26. The method of claim 23, wherein the signal configured to change the first priority indicator is programmed by a time mark.

27. The method of claim 23, wherein one or more additional priority indicators are associated with the broadcast stream using at least one of a pilot tone and a watermark.

28. The method of claim 23, wherein the first and second priority indicators are user specified.

* * * * *